United States Patent Office 3,293,255
Patented Dec. 20, 1966

3,293,255
NEW SUBSTITUTED COUMARINS
Darius Molho, Boulogne, and Eugène Boschetti, Venissieux, France, assignors to Lipha, Lyonnaise Industrielle Pharmaceutique
No Drawing. Filed Mar. 30, 1964, Ser. No. 355,900
Claims priority, application France, Apr. 5, 1963, 930,612, Patent 1,369,991; Mar. 12, 1964, 967,044, Patent 1,397,382
12 Claims. (Cl. 260—295.5)

The present invention relates to new 3-carboxamide coumarins, a certain number of their derivatives, and the processes for the preparation thereof.

Certain N-alkyl-3-carboxamide-4-hydroxy coumarins, endowed with inhibiting properties with regard to bacteria and microscopic fungi, have already formed the subject of U.S. Patent No. 3,122,557 issued to one of the present applications on February 25, 1964.

The compounds according to the invention differ therefrom by the fact that they comprise, on the carboxamide group, a substituent formed by a substituted alkylamino radical, and in that the nitrogen of the carboxamide group can be engaged in a piperazino ring.

These compounds correspond to the general formula:

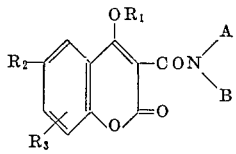

in which:

$R_1$ is a member of the group constituted by the hydrogen and the lower alkyl radicals;

$R_2$ is a member of the group constituted by the hydrogen and the halogens;

$R_3$ is a member of the group constituted by the hydrogen, the halogens, the lower alkyl radicals and the nitro radical;

A is a member of the group constituted by the atoms necessary for completing in combination with B and the adjacent nitrogen atom an N-alkyl piperazino ring, and the radical

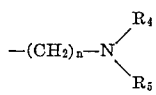

in which $n$ is an integer between 2 and 6.

$R_4$ is a member of the group constituted by the hydrogen, the alkyl, alkenyl, cycloalkyl radicals and the first link connected to the nitrogen atom adjacent a saturated heterocyclic nucleus, and $R_5$ is a member of the group formed by the alkyl, alkenyl, cycloalkyl, lower hydroxyalkyl, aryl radicals and the last link connected to the nitrogen atom adjacent a saturated heterocyclic nucleus; and B is a member of the group constituted by the hydrogen, and the atoms necessary for completing, in combination with A and the adjacent nitrogen atom, an N-alkyl piperazino ring.

The derivatives of these compounds which also form the subject of the invention are their sodium salts, their salts of mineral and organic acids, such as hydrochloric and nicotinic acids.

The new compounds can be obtained according to the invention by an alkyl ester of the general formula

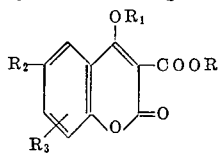

in which:
R is an alkyl radical;
$R_1$, $R_2$ and $R_3$ having the same meanings as indicated above, being condensed under heat with an amino derivative of the formula

in which A and B have the same meanings as indicated above.

According to a preferred modification of the invention, R is the ethyl radical, and the alcohol formed during the reaction can be separated by distillation.

According to another method, the carboxamides of the general formula

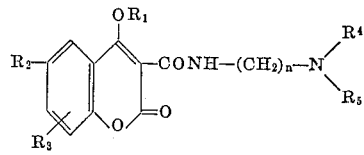

in which $n$, $R_1$, $R_2$, $R_3$, $R_4$ and $R_5$ have the same meanings as above, are obtained with good yields by an alkyl ester of the formula

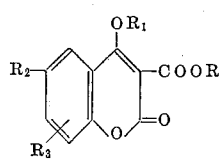

in which R, $R_1$, $R_2$ and $R_3$ have the meanings as above, being condensed under heat with an amino alcohol of the formula $H_2N-(CH_2)_n-OH$, in which $n$ has the foregoing values, the hydroxyl radical then being substituted by a halogen, such as chlorine, preferably by the action of thionyl chloride, so as to obtain the intermediary of the formula

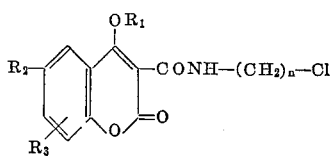

and by causing this intermediary to react on an amine of the formula

in which $R_4$ and $R_5$ have the same meanings as above.

The salts of the compounds according to the invention are obtained by neutralisation; for example, in the case of the hydrochlorides, by action of gaseous hydrochloric acid on the free base.

The new substituted carboxamides according to the invention present interesting properties, such as fibrinolytic properties, as local anaesthetics, and antiflammatory, analgesic and anti-tussive properties.

The anti-inflammatory activity has been determined by different methods. In the Van Cauwenberghe method, the activity coefficient has been compared with that of acetyl salicylic acid in the oedema of the paw of a rat, initiated by ovalbumin, and in the Winter method, it has been compared with that of the 1,2-diphenyl-3,5-dioxo-4-n-butyl pyrazolidine, in the oedema of the paw of a rat initiated by injection of carragenin.

The coefficient of anti-inflammatory activity of the comparison products has been fixed arbitrarily at 100, and the results obtained for the different products tested are set out in the following tables.

| Compound: | Coefficient of activity |
|---|---|
| Acetyl salicylic acid | 100 |
| (N - di - n-propylaminoethyl)-3-carboxamide-4-hydroxy coumarin | 70 |
| (N - di - n-butylaminoethyl)-3-carboxamide-4-hydroxy coumarin | 75 |
| (N - diisobutylaminoethyl) - 3-carboxamide-4-hydroxy coumarin | 100 |
| (N - monomethylaminoethyl)-3-carboxamide-4-hydroxy coumarin | 155 |
| 1,2-diphenyl-3,5-dioxo-4-n-butyl pyrazolidine | 100 |
| (N - di - n-propylaminoethyl)-3-carboxamide-4-hydroxy coumarin | 100 |
| (N - di - n-butylaminoethyl)-3-carboxamide-4-hydroxy coumarin | 100 |
| (N - diisobutylaminoethyl) - 3-carboxamide-4-hydroxy coumarin | 93 |
| (N - monomethylaminoethyl)-3-carboxamide-4-hydroxy coumarin | 88 |

The fibrinolytic properties have been shown by two testing methods, the measurement of the fibrinolytic activity being determined in vitro and in vivo.

In the in vitro tests, the first method used is the test for the lysis of fibrin plaques according to Astrup.

The product to be studied is dissolved in the physiological serum and its activity is studied on a freshly coagulated bovine fibrin plaque. The lysis is proportional to the concentration of the product.

The plaques are incubated for 18 hours at 37° C. for certain products. At a sufficient concentration (2.5%), the lysis is immediate and occurs at ambient temperature.

The bovine fibrin always contains the inactive plasminogenic form of fibrinolysin in a state of impurity. This proferment is destroyed by heating the clot of fibrin for 30 minutes at 80° C. After this treatment, the products according to the invention no longer show any action, whatever their concentration. They thus act as activators of the plasminogen to the same extent as Streptokinase or Urokinase. These diastases in fact act under the same conditions during their action by heating of the fibrin.

The fibrin plaque is produced by coagulation of a fibrinogen solution in the bottom of an extra flat Petri dish. The lytic solutions are deposited on the film of fibrin under a constant volume (20 mm.$^3$). The lysis is marked by the appearance of a dissolved zone, a clear stain, in the fibrin film at the place of the depositions.

Two perpendicular diameters of each lysis zone are then measured, and several measurements are carried out for the same concentration in different dishes.

These results are set out in the first column of the following table.

The mean of the values of the two perpendicular diameters is taken. The activity coefficient is expressed in relation to the activity of a selected standard product, namely, N - diethylaminoethyl - 3-carboxamide-4-hydroxy coumarin, which has a value of 100.

The second column of the table gives the results of the test carried out according to Lassen, in which the fibrin plaques are heated for 30 to 40 minutes to 80° C. for the purpose of destroying plasminogen and activators. The same solutions of products to be tested are deposited thereon and the reading takes place after incubation for 18 hours at 37° C., in the same way as for the unheated plaques.

This makes it possible to differentiate as regards the active products of the first test between their activity in direct fibrinolytic action (positive action on heated plaque, for example trypsin) or the activity which simply activates the plasminogen or the activators (no action on heated plaque).

In the third column, there are provided the activity coefficients of the product in the presence of plasma, that is to say, in the presence of plasmatic inhibitors. For this purpose, the products are dissolved in a defibrinated human plasma (to 4% or to the maximum of their solubilities). This solution is incubated for 4 hours at 37° C. and is then deposited on the unheated fibrin plaques, which are incubated for 18 hours at 37° C. The lysis zones are then measured: product of two perpendicular diameters. The coefficient is calculated as for the first column of the table.

In the in vivo tests, the measurement of the fibrinolytic activity of the plasma is determined before and 10 minutes after an intravenous injection of the $LD_{50}$ of the product.

Two techniques are used on each blood sample.

(1) The plasma is deposited on unheated fibrin plaques.

(2) Method of the euglobulins according to the Von Kaulla technique: on the one hand, with measurement of the lysis time in tubes, and on the other hand, measurement of the lysis zones (product of two perpendicular diameters) produced by the solution of euglobulin deposited on the unheated fibrin plaque. The test is carried out on three dogs; the result is the mean of these three tests.

The results of these tests are set out in the following table.

| | In Vitro | | In Vivo | | | |
|---|---|---|---|---|---|---|
| | Unheated fibrin plaque | | Unheated fibrin plaque | Experiment with dogs (average of 3 dogs) | | |
| | | | | Euglobulins | | Plasma |
| Products | Product in 2.5% solution in physiological serum—coefficient relatively to standard (product of 2 diameters of the lysis zone) (the standard chosen being the product for which $R_1=R_2=C_2H_5$; $R_3=R_4=R_5=H$; $n=2$. Coefficient=100 | Effect + or 0 | Product in 4% solution in defibrinated human plasma (solution incubated 4 hrs. at 37° C.). Coefficient relatively to the standard (product of 2 diameters of the lysis patch) | In tubes; percent shortening (+) or lengthening (−) of lysis time | On plaque; percent increase (+) or decrease (−) of lysis diameters | Directly deposited on the plaques; percent increase (+) and percent decrease (−) |
| Trypsin | | + | | | | |
| Ethyl Urethane | 6% | 0 | 100 | +20% | 0 | −28% |
| Sodium Nicotinate | 0 | 0 | 0 | +17% | +3% | +36% |
| $R_4=R_5=C_2H_5$; $R_1=R_2=R_3=B=H$; $n=2$ (hydrochloride) | 100 | 0 | 0 | +28% | +16% | 0 |
| $R_4=H$; $R_5=CH_3$; $R_1=R_2=R_3=B=H$; $n=2$ (hydrochloride) | 119% | 0 | 33 | | | |
| $R_4=R_5=CH_3$; $R_1=R_2=R_3=B=H$; $n=2$ (hydrochloride) | 135% | 0 | 96 | +33% | +21% | +383% |
| $R_4=R_5=C_2H_5$; $R_1=R_2=R_3=B=H$; $n=2$ (nicotinate) | 48.5% | 0 | 0 | −17% | −9% | +32% |

The local anaesthetic activity has been studied in two of its forms:

(a) Contact local anaesthesia (Lechat method) on the cornea of the eye of a rabbit, with respect to Xylocaine.

(b) Local anaesthesia by infiltration (Mokhtar-Bulbing Wajde method) on the skin of the back of a guinea pig.

The results of this investigation are set out in the following table.

| Products | Coefficients | |
|---|---|---|
| | Local anaesthesia by contact | Local anaesthesia by infiltration |
| Xylocaine | 100 | 100 |
| $R_4=R_5=C_4H_9n$; $R_1=R_2=R_3=B=H$; n=4 (hydrochloride) | 400 | 250 |
| $R_4=R_5=C_4H_9n$; $R_1=R_2=R_3=B=H$; n=3 (hydrochloride) | 200 | 500 |
| $R_4=R_5=C_3H_7n$; $R_1=R_2=R_3=B=H$; n=2 (hydrochloride) | 100 | 100 |
| $R_4=R_5=C_4H_9n$; $R_1=R_2=R_3=B=H$; n=2 (hydrochloride) | 4,000 | 400 |
| $R_4=CH_3$; $R_3=R_1=R_2=R_5=B=H$; n=2 (hydrochloride) | <100 | <100 |

The anti-tussive activity was tested by testing the inhibition of the cough caused by ammonia being sprayed as an aerosol on a guinea pig. This given coefficient is equal to the ratio between the $LD_{50}$ intraperitoneally with a mouse and the active dose 100 of the product on a guinea pig (dose which completely suppresses the cough).

| Products | Activity coefficient |
|---|---|
| Codeine Phosphate | 7.5 |
| $R_4=R_5=C_4H_9n$; $R_1=R_2=R_3=B=H$ n=2 (hydrochloride) | 140/14=10 |
| $R_4=R_5=C_4H_9n$; $R_3=CH_3$ (in 8) $R_1=R_2=B=H$; n=4 (hydrochloride) | 75/9.35=8 |

The investigation of the hypotensive activity on a dog has shown the weak gangliOplegic action of certain products.

The preparation and the physical properties of various compounds according to the invention are hereinafter described by means of non-limitative examples.

*Example 1.—(N-dimethylaminoethyl)-3-carboxamide-4-hydroxy coumarin*

Developed formula

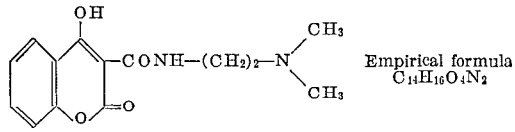

Empirical formula $C_{14}H_{16}O_4N_2$

A mixture of 2.34 g. (0.01 mol) of 4-hydroxy-3 carbethoxy coumarin with 1.05 g. (0.012 mol) of N,N-dimethyl ethylene diamine (boiling point at normal pressure=101–104° C.; obtained according to El Crisol 7, 19–23, 1953) is heated for 5 minutes to 130° C., distilling off the alcohol formed during the reaction.

On cooling, the product solidifies; it is then washed with hot alcohol. Recrystallised from a large volume of hot acetone, the product melts at 210° C. The yield is 2.25 g.

The hydrochloride prepared by bubbling gaseous HCl into a hot alcoholic suspension is solubilised as it is formed, and then crystallises in the cold; it melts at 243–245° C.

*Gravimetric analysis.* — $C_{14}H_{16}O_4N_2HCl$ calculated: N%, 8.96. Found: N%, 8.83.

*Example 2.—(N-diethylaminoethyl)-3-carboxamide-4-hydroxy coumarin*

$C_{16}H_{20}O_4N_2$

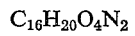
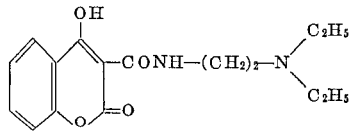

4.68 g. (0.02 mol) of 4-hydroxy-3 carbethoxy coumarin are heated for 1 hour to 150° C. with 2.78 g. (0.024 mol) of N,N-diethyl ethylene diamine (B.P.=144–145° C.; J. Am. Chem. Soc. 67, 539, 1945) while distilling off the alcohol formed in the reaction.

On cooling, the product solidifies; after recrystallisation from alcohol, it is obtained in the form of white crystals with a melting point of 154–155° C. The yield is 4.6 g.

The hydrochloride is obtained by passage of a stream of gaseous HCl into the solution of the free base in absolute alcohol. This salt melts at 225° C.

The base can also be prepared without distillation of the alcohols formed during the reaction, simply by the starting products, used in the same proportions, being heated under reflux at 100° C. for 2 hours.

*Gravimetric analysis.*—Calculated: C%, 63.15; H%, 6.57. Found: C%, 62.79; H%, 6.68.

The corresponding nicotinate is prepared by the action of nicotinic acid: 1.23 g. of this acid on 3.04 g. (0.01 mol) of base in absolute alcohol. Heating takes place for solubilisation and the formed salt crystallises in the cold, a white product being obtained which has a melting point of 147–150° C.

*Gravimetric analysis.*—$C_{22}H_{25}O_6N_3$, calculated: C%, 61.82; H%, 5.85; N%, 9.83. Found: C%, 61.30; H%, 6.08; N%, 9.92.

*Example 3.—(N-di-n-propylaminoethyl)-3-carboxamide-4-hydroxy coumarin*

$C_{18}H_{24}O_4N_2$

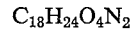
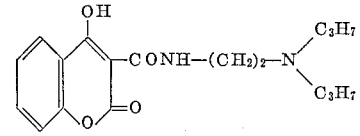

A mixture of 11.7 g. (0.05 mol) of 4-hydroxy-3 carbethoxy coumarin and 8 g. (0.055 mol) of N,N-di-n-propyl ethylene diamine (B.P. $_{39.4\ millibars}$=87–88° C.; C.R. Acad. Sci. U.S.S.R. 55, 315–317, 1947) is heated for 1½ hours to 140° C., while distilling the alcohol formed in the reaction.

On cooling, crystallisation of the product occurs, and after washing with boiling water and recrystallising from alcohol, there is obtained a yield of 12.2 g. (73%).

The hydrochloride of formula $C_{18}H_{24}O_4N_2HCl$ melts at 189° C.

*Gravimetric analysis.*—Calculated: C%, 58.61; H%, 6.78; N%, 7.59. Found: C%, 58.65; H%, 6.73; N%, 7.64.

*Example 4.—(N-di-n-butylaminoethyl)-3-carboxamide-4-hydroxy coumarin*

$C_{20}H_{28}O_4N_2$

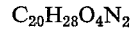
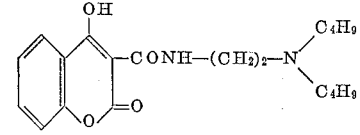

A mixture of 2.34 g. (0.01 mol) of 4-hydroxy-3 carbethoxy coumarin and 2.06 g. (0.012 mol) of N,N-di-n-butyl ethylene diamine (B.P. $_{17.7\ millibars}$=99° C.; J. Am.

Chem. Soc. 67, 539, 1945) is heated for about 1½ hours to the region of 140–150° C.

After cooling, the oil which is obtained gives a crystallised product when it is poured into cold alcohol. A second crystallisation in dilute alcohol gives a white product melting at 110° C. The yield is 70%.

The corresponding hydrochloride melts at 142° C.

*Gravimetric analysis.*—$C_{20}H_{28}O_4N_2HCl$, calculated: C%, 60.52; H%, 7.31; N%, 7.06. Found: C%, 60.64; H%, 7.30; N%, 6.89.

*Example 5.—(N-diisobutylaminoethyl)-3-carboxamide-4-hydroxy coumarin*

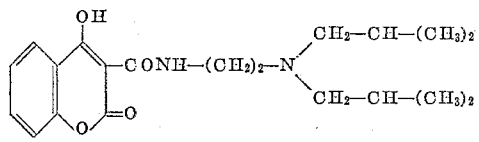

The conditions of Example 4 are used, with N,N-diisobutyl ethylene diamine (B.P. $_{21\ millibars}$=86° C.). The base obtained melts at 78° C. (after recrystallisation from alcohol). The corresponding hydrochloride, $$C_{20}H_{28}O_4N_2.HCl$$

melts at 179–180° C.

*Gravimetric analysis.*—Calculated: C%, 60.52; H%, 7.31; N%, 7.06. Found: C%, 60.54; H%, 7.27; N%, 7.18.

*Example 6.—(N-di-sec.-butylaminoethyl)-3-carboxamide-4-hydroxy coumarin*

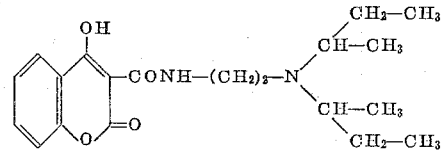

The conditions of Example 4 are followed, but using N,N-di-sec.-butyl ethylene diamine (B.P. $_{23\ millibars}$=95–96° C. El Crisol 7, 19–23, 1953). The base obtained melts at 81° C. (after recrystallisation from alcohol).

The corresponding hydrochloride melts at 188–189° C.

*Gravimetric analysis.*—$C_{20}H_{28}O_4N_2.HCl$, calculated: N%, 7.06. Found: N%, 6.94.

*Example 7.—(-monomethylaminoethyl)-3-carboxamide-4-hydroxy coumarin*

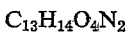

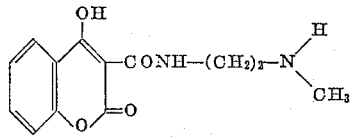

23.4 g. (0.1 mol) of 4-hydroxy-3 carbethoxy coumarin and 8.10 g. (0.11 mol) of N-methyl ethylene diamine (Product of Fluka Company), are heated for 30 minutes to 140–145° C., distilling off the alcohol formed during the reaction.

After heating for 30 minutes, the product starts to crystallise in order to solidify in the cold. It is recrystallised from alcohol, in which it is very sparingly soluble. There are obtained 21.5 g. of white crystals melting at 220–222° C. (unless stated, all the melting points indicated in the invention have been taken in a tube sealed to the Gallenkamp apparatus).

The hydrochloride is prepared by bubbling a gaseous stream of dry hydrochloric acid into a suspension of the base in hot alcohol. As the hydrohcloride is formed, it is solubilised in ethanol in order to crystallise in the cold; it melts at 238–240° C.

*Gravimetric analysis.*—$C_{13}H_{14}O_4N_2 \cdot HCl$, calculated: C%, 52.26; H%, 5.02; N%, 9.38. Found: C%, 52.16; H%, 5.15; N%, 9.27.

*Example 8.—[(2'-hydroxyethyl)-aminoethyl]-3-carboxamide-4-hydroxy coumarin*

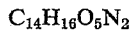

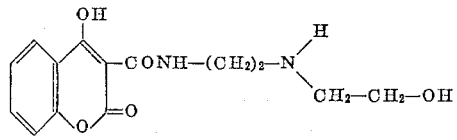

11.7 g. (0.05 mol) of 4-hydroxy-3-carbethoxy coumarin and 5.72 g. (0.055 mol) of N-(2-hydroxyethyl-ethylene diamine: B.P.=128–132° C. at 12 millibars (Dok. Akad. Nauk S.S.S.R., 59,489, 1948) are heated for 30 minutes to 150° C. while distilling off the alcohol formed in the reaction. The resinous product obtained after cooling is placed in boiling alcohol, in which it it is very sparingly soluble, until it assumes a pulverulent appearance.

A recrystallisation from a large volume of alcohol does not increase its boiling point, which is 232° C. Yield 12.4 g.

The hydrochloride thereof melts at 206° C.

*Example 9.—(N-phenylaminoethyl)-3-carboxamide-4-hydroxy coumarin*

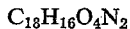

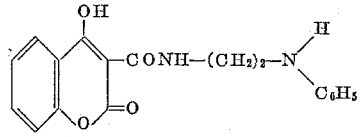

4.68 g. (0.02 mol) of 4-hydroxy-3 carbethoxy coumarin and 2.85 g. (0.021 mol) of N-phenyl ethylene diamine B.P.$_{19\ millibars}$=150–153° C. obtained according to G.I. Braz Doklady Akad. Nauk S.S.S.R. 59, 489 (1948), are heated for 1 hour to 155° C. while distilling off the alcohol formed in the reaction.

On completing the reaction, the remaining volatile products are removed in vacuo and the mass is caused to crystallise in a large volume of ethanol. After a second crystallisation, the product crystallises as clear yellow crystals melting at 128° C.

The hydrochloride thereof is very sparingly soluble in water.

*Gravimetric analysis.*—Calculated: C%, 66.46; H%, 4.92; N%, 8.61. Found: C%, 66.43; H%, 4.99; N%, 8.63.

*Example 10.—[N-(ethyl)-piperidino]-3-carboxamide-4-hydroxy coumarin*

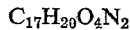

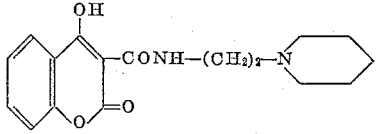

2.3 g. (0.01 mol) of 4-hydroxy-3 carbethoxy coumarin and 1.40 g. (0.01 mol) of 1 - piperidino - 2 - ethylene amine (B.P.$_{12.2\ millibars}$=58–61° C.; Dok. Akad. Nauk S.S.S.R. 59. 489–492, 1948) are heated for 10 minutes to the region of 150° C. On cooling, the product solidifies, and after washing in water and recrystallising from alcohol, it melts at 190° C. The yield is 2.5 g.

*Gravimetric analysis.*—Calculated: C%, 64.55; H%, 6.32; N%, 8.86. Found: C%, 64.13; H%, 6.23; N%, 8.58.

The corresponding hydrochloride melts at 240° C.

*Example 11.—[N-(ethyl)-morpholino]-3-carboxamide-4-hydroxy coumarin*

$C_{16}H_{18}O_5N_2$

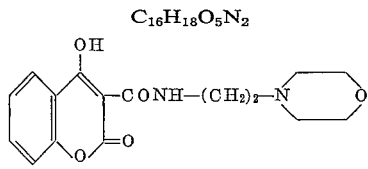

2.34 g. (0.01 mol) of 4-hydroxy-3-carbethoxy coumarin and 1.43 g. (0.011 mol) of 1-morpholino-2-ethylene amine (B.P. $_{7.5 \text{ millibars}}$=69–70° C.; Dok. Akad. Nauk S.S.S.R. 59, 489–492, 1948) are heated to 130° C. for about 1 hour. After recrystallisation, the product melts at 133° C. The yield is 2.8 g.

*Gravimetric analysis.*—Calculated: C%, 60.37; H%, 5.66; N%, 8.80. Found: C%, 60.49; H%, 5.73; N%, 8.81.

The hydrochloride melts at 249° C. (with decomposition).

*Example 12.—(N-diethylaminoethyl)-3-carboxamide-6-bromo-4-hydroxy coumarin*

$C_{16}H_{19}O_4N_2Br$

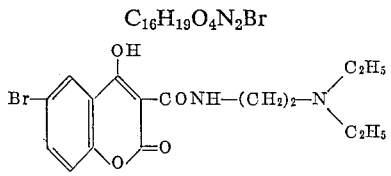

6.26 g. (0.02 mol) of 6-bromo-4-hydroxy-3-carbethoxy coumarin and 2.54 g. (0.022 mol) of diethyl ethylene diamine (B.P.=144–145° C.; J. Am. Chem. Soc. 67, 539, 1945) are heated for 1 hour to 130° C. After crystallisation in the cold, purification and recrystallisation, the product melts at 204° C.

The hydrochloride, prepared as indicated above, is obtained in the form of brilliant flakes and melts at 228–230° C.

*Gravimetric analysis.*—$C_{16}H_{19}O_4N_2Br.HCl$, calculated: C%, 45.76; H%, 4.76; N%, 6.67. Found: C%, 45.52; H%, 4.96; N%, 6.48.

*Example 13.—[N-(ethyl)-piperidino]-3-carboxamide-6-bromo-4-hydroxy coumarin*

$C_{17}H_{19}O_4N_2Br$

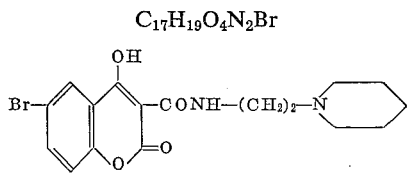

Prepared according to the conditions of Example 9, this product melts at 224° C. and the corresponding hydrochloride has a melting point of 238–240° C.

*Gravimetric analysis.*—$C_{17}H_{19}O_4Br.HCl$, calculated: C%, 47.27; H%, 4.63; N%, 6.48. Found: C%, 47.32; H%, 4.65; N%, 6.46.

*Example 14.—(N-dibutylaminoethyl)-3-carboxamide-6-bromo-4-hydroxy coumarin*

$C_{20}H_{27}O_4N_2Br$

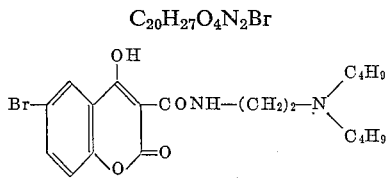

The product is prepared according to Example 10, with N,N-dibutyl ethylene diamine. A white product is obtained which melts at 108–110° C. The corresponding hydrochloride, $C_{20}H_{27}O_4N_2Br.HCl$, melts at 176° C.

*Example 15.—(N-diethylaminoethyl)-3-carboxamide-6-chloro-4-hydroxy coumarin*

$C_{16}H_{19}O_4N_2Cl$

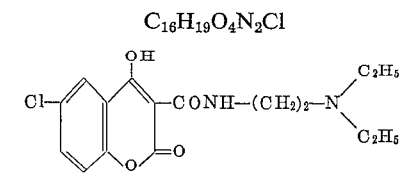

2.68 g. (0.01 mol) of 6-chloro-4-hydroxy-3-carbethoxy coumarin and 1.27 g. (0.011 mol) of diethyl ethylene diamine are heated for 30 minutes, while distilling off the alcohol formed during the reaction. After purification and crystallisation, the white product which is obtained melts at 206° C.; its hydrochloride, with the formula $C_{16}H_{19}O_4N_2Cl.HCl$, melts at 225° C.

*Example 16.—[N-(ethyl)-morpholino]-3-carboxamide-6-chloro-4-hydroxy coumarin*

$C_{16}H_{17}O_5N_2Cl$

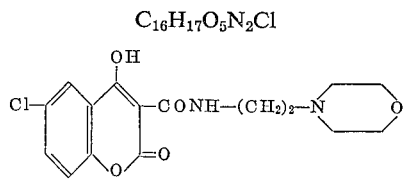

Obtained as in the preceding example, but using the morpholino ethylene diamine (B.P.$_{7.5 \text{ millibars}}$=69° C.; Dok. Akad. Nauk S.S.S.R. 59, 489–492, 1948), the product is obtained as fine needles of very light yellow colour, the melting point thereof being 186° C. The corresponding hydrochloride, of formula $C_{16}H_{17}N_2Cl \cdot HCl$, melts at 263° C.

*Example 17.—(N-diethylaminoethyl)-3-carboxamide-7-iodo-4-hydroxy coumarin*

$C_{16}H_{19}O_4N_2I$

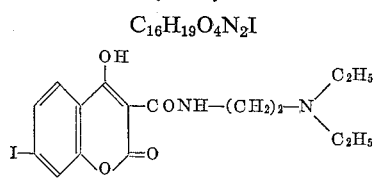

The base, obtained by heat condensation of 3.60 g. (0.01 mol) of 7-iodo-4-hydroxy-3-carbethoxy coumarin with 1.27 g. (0.011 mole) of diethyl ethylene diamine, and distillation of the alcohol formed in the reaction, is obtained in the form of an oil.

The corresponding hydrochloride is a pulverulent product which is light beige in colour and melts at 244° C.

*Example 18.—(N-diethylaminoethyl)-3-carboxamide-6,8-diiodo-4-hydroxy coumarin*

$C_{16}H_{18}O_4N_2I_2$

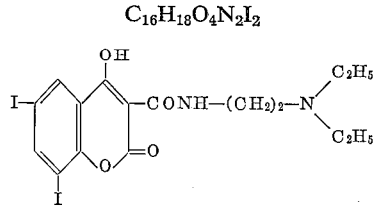

4.8 g. (0.01 mol) of 6,8-diiodo-4-hydroxy-3-carbethoxy coumarin and 1.27 g. (0.011 mol) of diethyl ethylene diamine are heated for 1 hour to 150° C., while distilling the ethyl alcohol formed in the reaction. After the amine excess has been distilled in vacuo, the product which is obtained has the form of a very hard mass which is reddish in colour.

After purification and solubilisation is hot alcohol, a current of HCl is supplied until the pH value is about 2, and the hydrochloride crystallises in a refrigerator into a beige product which, after a second crystallisation in alcohol, is light yellow and has a melting point of 238° C.

*Example 19.—(N-diallylaminoethyl)-3-carboxamide-4-hydroxy coumarin*

$C_{18}H_{20}O_4N_2$

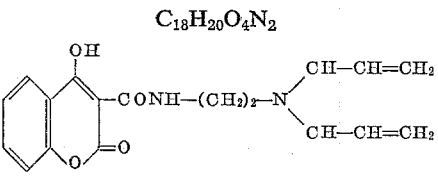

4.68 g. (0.02 mol) of 4-hydroxy-3 carbethoxy coumarin and 3.08 g. (0.22 mol) of diallyl ethylene diamine (B.P.$_{27.2\ millibars}$=79° C.; Dok. Akad. Nauk S.S.S.R. 59, 489–492, 1948), are heated to the region of 140° C., while distilling off the alcohol formed in the reaction, this taking 45 minutes to 1 hour.

The substance is allowed to cool to ambient temperature after the traces of amine in excess have been removed in vacuo; the product solidifies. It is washed with hot water and recrystallised from alcohol. The product is obtained in the form of white crystals which melt at 82° C. The corresponding hydrochloride, of formula $C_{18}H_{21}O_4N_2Cl$, melts at 156–157° C.

*Gravimetric analysis.*—Calculated: C%, 59.25; H%, 5.76; N%, 7.68. Found: C%, 59.21; H%, 5.69; N%, 7.81.

*Example 20.—(N-dimethylaminoethyl)-3-carboxamide-8-methyl-4-hydroxy coumarin*

$C_{15}H_{18}O_4N_2$

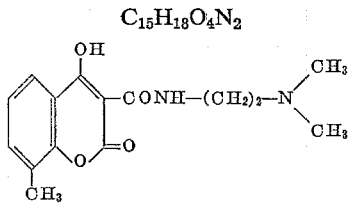

7.44 g. (0.03 mol) of 8-methyl-4-hydroxy-3 carbethoxy coumarin, B.P.=107° C. (according to the method of Anschutz Annalen 379–341 for the methyl ester, M.P.=109° C.) and 2.9 g. (0.033 mol) of N,N-dimethyl ethylene diamine (B.P. 101–104° C.—El Crisol 7, 19–23—1953) are heated for 30 minutes in a metal bath to 125° C., distilling off the reactional alcohol.

The volatile products are removed in vacuo and the residue is dissolved in a large volume of alcohol. A second recrystallisation does not raise the melting point, which is 163° C. Yield 8 g. The corresponding hydrochloride melts at 238° C.

*Gravimetric analysis.*—$C_{15}H_{18}O_4N_2$.HCl, calculated: C%, 55.13; H%, 5.81; N%, 8.57. Found: C%, 55.35; H%, 5.96; N%, 8.48.

*Example 21.—(N-diethylaminoethyl)-3-carboxamide-8-methyl-4-hydroxy coumarin*

$C_{17}H_{22}O_4N_2$

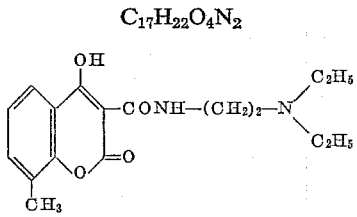

7.44 g. (0.03 mol) of 3-carbethoxy-8-methyl-4-hydroxy coumarin and 3.65 g. (0.0315 mol) of N,N-diethyl ethylene diamine, having the same characteristics as the product used in Example 4, are heated for 45 minutes on a metal bath to 150° C., while distilling the alcohol which has formed. The volatile products are then removed in vacuo.

The resinous mass is taken up in a large volume of alcohol and a second crystallisation is carried out, likewise in ethanol: 6.2 g. of white crystals melting at 151° C., are obtained.

The hydrochloride, prepared in hot alcohol under a stream of dry HCl, crystallises as fine white crystals which are very soluble in water and melt at 235° C.

*Gravimetric analysis.*—$C_{17}H_{22}O_4H_2$.HCl, calculated: C%, 57.54; H%, 6.48; N%, 7.89. Found: C%, 57.72; H%, 6.61; N%, 7.78.

*Example 22.—(N'-ethyl morpholino)-3-carboxamide-8-methyl-4-hydroxy coumarin*

$C_{17}H_{20}O_5N_2$

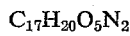
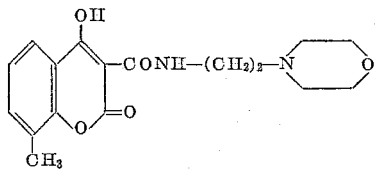

7.44 g. (0.03 mol) of 3-carbethoxy-8-methyl-4-hydroxy coumarin are heated for 45 minutes to 125° C. with 4.09 g. (0.0315 mol) of morpholine ethylene diamine (B.P. $_{7.5\ millibars}$=69–70° C.—Dok. Akad. Nauk, S.S.S.R. 59, 489 (1948)) while distilling off the alcohol which has formed.

By removing the volatile products in vacuo, the product crystallises. Taken up in ethyl alcohol, this product crystallises as fine white flakes which melt at 134° C. There are thus obtained 9 g. of the expected product.

The corresponding hydrochloride melts at 239° C.

*Gravimetric analysis.*—$C_{17}H_{20}O_5N_2$.HCl, calculated: C%, 55.35; H%, 5.69; N%, 7.59. Found: C%, 55.28; H%, 5.89; N%, 7.47.

*Example 23.—(N-monomethylaminoethyl)-3-carboxamide-8-methyl-4-hydroxy coumarin*

$C_{14}H_{16}O_4N_2$

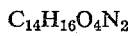
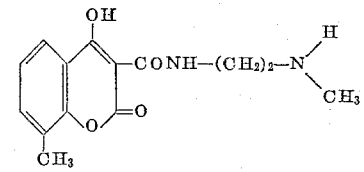

The operation is carried out under the conditions defined in Example 7, using 6.2 g. (0.025 mol) of 3-carbethoxy-8-methyl-4-hydroxy coumarin and 2.22 g. (0.03 mol) of N-methyl ethylene diamine—B.P. =228° C. (alcohol)—yield 5.6 g.

The hydrochloride melts at 215° C. (hygroscopic) and crystallises with one molecule of water.

*Gravimetric analysis.*—$C_{14}H_{16}O_4N_2$.HCl.H$_2$O, calculated: C%, 50.83; H%, 5.74. Found: C%, 50.94; H%, 5.81.

*Example 24.—(N-dimethylaminoethyl)-3-carboxamide-7-nitro-4-hydroxy coumarin*

$C_{14}H_{15}N_3O_6$

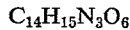
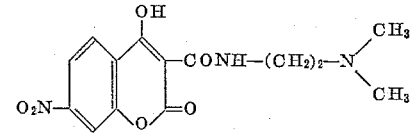

5.58 g. (0.02 mol) of 3-carbethoxy-7-nitro-4-hydroxy coumarin (M. Julia, Bul. Soc. Chim., F., 1952, page 779), melting at 198° C., are intimately mixed with 1.93 g. (0.022 mol) of N,N-dimethyl ethylene diamine (having the same characteristics as in Example 20).

The mixture is brought for 45 minutes to 145° C., while distilling off the alcohol formed in the reaction, and then the amine excess and the remaining alcohol are removed in vacuo.

The product solidifies into a yellowish mass. After being taken up in boiling alcohol and recrystallised from dimethyl formamide, a crystalline product is obtained which has the melting point of 270–272° C.

*Gravimetric analysis.*—Calculated: N%, 13.08. Found: N%, 12.97.

*Example 25.*—(*N-diethylaminoethyl*)*-3-carboxamide-7-nitro-4-hydroxy coumarin*

$C_{16}H_{19}O_6N_3$

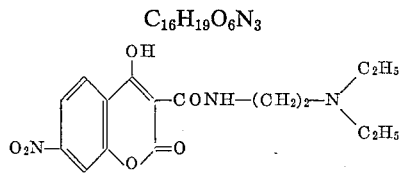

Under the conditions of the preceding example, 2.79 g. (0.01 mol) of 3-carbethoxy-7-nitro-4-hydroxy coumarin are heated with 1.3 g. (0.011 mol) of N,N-diethyl ethylene diamine for 30 minutes to 135° C., distilling off the alcohol formed in the reaction.

The temperature is allowed to fall again towards 100° C. and the volatile products are removed in vacuo with a water jet.

The resinous product obtained is recrystallized from a large volume of isopropanol and a crystalline solid is obtained with a yield of 83% and a melting point of 260° C. (microscope).

The corresponding hydrochloride melts at 210–231° C. (Gallenkamp) and is obtained as yellow crystals which are very sparingly soluble in water.

The corresponding sodium salt is more soluble.

*Gravimetric analysis.*—$C_{16}H_{19}O_6N_3 \cdot HCl$, calculated: C%, 49.80; H%, 5.18; N%, 10.89. Found: C%, 49.65; H%, 5.31; N%, 10.79.

*Example 26.*—(*N-methylaminoethyl*)*-3-carboxamide-7-nitro-4-hydroxy coumarin*

$C_{13}H_{13}N_3O_6$

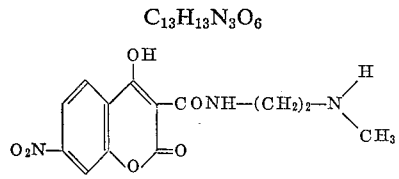

5.58 g. (0.02 mol) of 3-carbethoxy-7-nitro-4-hydroxy coumarin are progressively heated on a metal bath with 1.63 g. (0.022 mol) of N-methyl ethylene diamine for 1½ hours to 150° C. while distilling off the alcohol formed.

The volatile products are removed in vacuo and the remaining yellow product is washed several times in boiling ethanol. The product obtained melts at 276° C. (with decomposition)—yield 93%.

The hydrochloride is insoluble in water.

The sodium salt prepared by the action of sodium hydroxide in equimolecular quantity on the free base in acetone under heat is obtained as fine yellow crystals which are soluble in water.

*Gravimetric analysis.*—$C_{13}H_{13}N_3O_6$, calculated: C%, 50.81; H%, 4.23; N%, 13.68. Found: C%, 50.79; H%, 4.35; N%, 13.82.

*Example 27.*—(*N-dimethylaminopropyl*)*-3-carboxamide-4-hydroxy coumarin*

$C_{15}H_{18}O_4N_2$

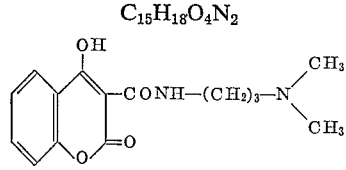

Under the conditions of the preceding examples, 2.3 g. (0.01 mol) of 4-hydroxy-3 carbethoxy coumarin are heated with 1.12 g. (0.011 mol) of N,N-dimethylaminopropylamine (B.P.=135° C., prepared by the Union Carbide Chemical Company). The reaction ceases with the completion of the distillation of the alcohol formed during the condensation, this taking about one hour.

The product is placed in vacuo for a few minutes in order to eliminate the amine excess and it crystallises. After purification and recrystallisation from alcohol, the desired base is obtained in the form of white crystals melting at 140° C. and soluble in water.

The hydrochloride obtained in absolute alcohol with gaseous HCl, after being recrystallised once, melts at 238° C.

*Gravimetric analysis.*—Calculated: C%, 55.13; H%, 5.81; N%, 8.57. Found: C%, 55.22; H%, 5.87; N%, 8.29.

*Example 28.*—(*N-diethylaminopropyl*)*-3-carboxamide-4-hydroxy coumarin*

$C_{17}H_{22}O_4H_2$

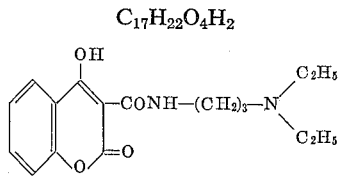

Preparation identical with that of Example 27, but using N,N-diethylaminopropylamine (B.P.=170° C., Fluka).

The free base melts at 168° C. and the corresponding hydrochloride at 216° C.

*Gravimetric analysis.*—Calculated: C%, 57.54; H%, 6.48. Found: C%, 57.70; H%, 6.55.

*Example 29.*—(*N-di-n-butylaminopropyl*)*-3-carboxamide-4-hydroxy coumarin*

$C_{21}H_{30}O_4N_2$

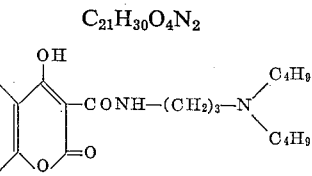

2.34 g. (0.01 mol) of 4-hydroxy-3 carbethoxy coumarin and 2.04 g. (0.011 mol) of di-n-butylamino propylamine (B.P. $_{20.4 \text{ millibars}}$=114° C., El Crisol, 7, 19–23, 1953) are treated.

There are obtained 3.2 g. of a product melting at 108° C. The corresponding hydrochloride has a melting point of 120–122° C.

*Gravimetric analysis.*—Calculated: C%, 61.38; H%, 7.55; N%, 6.82. Found: C%, 61.24; H%, 7.59; N%, 6.97.

*Example 30.*—[*N-(propyl)-morpholino*]*-3-carboxamide-4-hydroxy coumarin*

$C_{17}H_{20}O_5N_2$

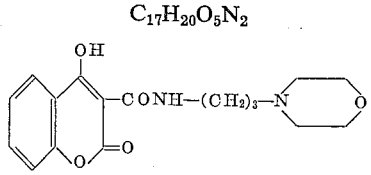

A mixture of 8.4 g. (0.03 mol) of 3-carbethoxy-7-nitro-4-hydroxy coumarin and 4.8 g. (0.033 mol) of 1-amino-3-morpholino propane, B.P. $_{34 \text{ millibars}}$=115° C., is progressively heated to 150° C. for 1 hour, distilling off the alcohol as it is formed during the reaction.

The product, treated in vacuo and then recrystallised, melts at 214° C. (heating stage microscope). Yield: 8 g. of bright yellow crystals, after being washed several times in boiling alcohol.

The corresponding hydrochloride melts at 230° C. The sodium salt is infusible at 250° C. (soluble in water).

*Gravimetric analysis.*—$C_{17}H_{19}N_3O_7 \cdot HCl$, calculated: C%, 49.33; H%, 4.83; N%, 10.15. Found: C%, 49.33; H%, 4.98; N%, 10.06.

*Example 32.—(N-di-n-propylaminobutyl)-3-carboxamide-4-hydroxy coumarin*

$C_{20}H_{28}O_4N_2$

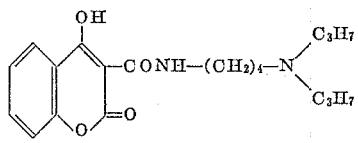

2.35 g. (0.01 mol) of 4-hydroxy-3 carbethoxy coumarin and 1.89 g. (0.011 mol) of di-n-propylamino butylamine (B.P. $_{19\ millibars}$=102–105° C.) are heated to the region of 140° C. for about 1 hour while distilling off the forming alcohol.

After purification and recrystallisation from absolute alcohol, the free base is obtained, which consists of white crystals melting at 147° C. The yield is 3.1 g.

The corresponding hydrochloride melts at 200° C.

*Gravimetric analysis.*—$C_{20}H_{28}O_4N_2 \cdot HCl$, calculated: C%, 60.52; H%, 7.31; N%, 7.06. Found: C%, 60.36; H%, 7.29; N%, 7.05.

*Example 33.—(N-di-n-butylaminobutyl)-3-carboxamide-4-hydroxy coumarin*

$C_{22}H_{32}O_4N_2$

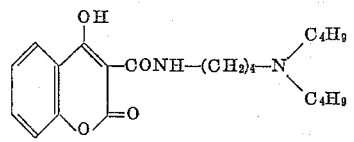

The same procedure as previously is used, with 4-di-n-butylamino butylamine (B.P. $_{19\ millibars}$=129° C.; J. Am. Chem. Soc. 74, 4306, 1952).

The base is obtained with a yield of 80% in the form of a white product having a melting point of 122° C.

The corresponding hydrochloride has a melting point of 255° C.

*Gravimetric analysis.*—$C_{22}H_{32}O_4N_2 \cdot HCl$, calculated: C%, 62.19; H%, 7.77; N%, 6.59. Found: C%, 62.16; H%, 7.92; N%, 6.39.

*Example 34.—(N-di-n-propylaminobutyl)-3-carboxamide-8-methyl-4-hydroxy coumarin*

$C_{21}H_{30}O_4N_2$

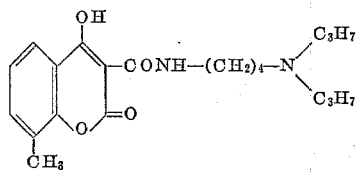

7.44 g. (0.03 mol) of 3-carbethoxy-8-methyl-4-hydroxy coumarin and 5.42 g. (0.0315 mol) of di-n-propylamino-butylamine (B.P. $_{19\ millibars}$=102–105° C.) are heated on a metal bath for 30 minutes to 160° C.

After purification and after recrystallisation twice from ethanol, the product is obtained in the form of white crystals melting at 112° C. (yield 10 g.).

The corresponding hydrochloride melts at 194° C.

*Gravimetric analysis* — $C_{21}H_{30}O_4N_2 \cdot HCl$, calculated: C%, 61.38; H%, 7.55; N%, 6.82. Found: C%, 61.23; H%, 7.65; N%, 6.80.

*Example 35.—(N-di-n-butylaminobutyl)-3-carboxamide-8-methyl-4-hydroxy coumarin*

$C_{23}H_{34}O_4N_2$

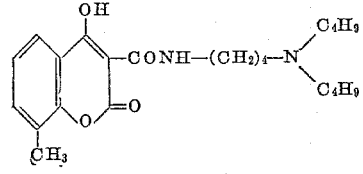

7.44 g. (0.03 mol) of 3-carbethoxy-8-methyl-4-hydroxy coumarin and 6.3 g. (0.0315 mol) of di-n-butylamino butylamine are heated for 45 minutes to 160° C. on a metal bath, while distilling the alcohol which is formed. The flask is then left in vacuo for 5 minutes at 100° C. and the crude resinous product is taken up in alcohol. It is allowed to crystallise in the cold and a second crystallisation in alcohol is carried out.

The base crystallises as fine white crystals which melt at 102° C. (yield 10.1 g.).

The corresponding hydrochloride melts at 147° C.

*Gravimetric analysis.* — $C_{23}H_{34}C_4N_2$, calculated: C%, 62.94; H%, 7.98; N%, 6.38. Found: C%, 62.82; H%, 7.98; N%, 6.40.

*Example 36.—(N-di-n-propylaminobutyl)-3-carboxamide-7-nitro-4-hydroxy coumarin*

$C_{20}H_{27}N_3O_6$

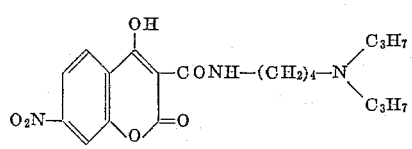

Using the conditions of the preceding examples, 5.58 g. (0.02 mol) of 3-carbethoxy-7-nitro-4-hydroxy coumarin are treated with 3.78 g. (0.022 mol) of di-n-propylamino butylamine (B.P. $_{19\ millibars}$=102–105° C.).

The recrystallisation in a mixture of alcohol and dimethyl formamide gives yellow crystals which melt at 178° C. (heating stage microscope). Yield: 4.3 g. (53%).

The sodium salt is prepared by the action of 0.44 g. (0.011 mol) of NaOH in solution in 3 cc. of water on 4 g. (0.01 mol) of the free base in suspension in 50 cc. of acetone. The temperature is brought to 50° C., the acetone is evaporated and crystallisation is effected by washing with ether. Yield 4 g., yellow crystals which are soluble in cold water.

*Gravimetric analysis.*—$C_{20}H_{27}N_3O_6$, calculated: C%, 59.25; H%, 6.66; N%, 10.37. Found: C%, 59.45; H%, 6.70; N%, 10.34.

*Example 37.—(N-diethylaminohexyl)-3-carboxamide-4-hydroxy coumarin*

$C_{20}H_{28}O_4N_2$

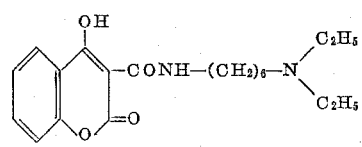

2.34 g. (0.01 mol) of 3-carbethoxy-4-hydroxy coumarin and 1.87 g. (0.011 mol) of 6-diethylamino hexylamine, B.P.=103–107° C. at 100 millibars (J. Chem. Soc. 68, 1946, page 101), are heated for 1 hour to 180° C. while distilling the alcohol which has formed.

After being recrystallised twice from alcohol, the product obtained melts at 227–119° C. The corresponding hydrochloride melts at 232° C. and is insoluble in cold water.

*Example 38.—N-methyl-3-N'-piperazido-4-hydroxy coumarin monohydrate*

$C_{15}H_{16}O_4N_2 \cdot H_2O$

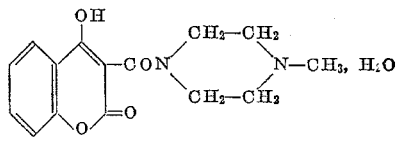

4.68 g. (0.02 mol) of 4-hydroxy-3 carbethoxy coumarin and 2.2 g. (0.022 mol) of N-methyl piperazine (B.P. $_{760\ millibars}$=137° C.) are heated for 1½ hours while eliminating the forming ethanol.

The temperature is allowed to fall to 100° C. and then the volatile products are distilled in vacuo. The resinous mass which is obtained, after crystallisation from alcohol and acetone, gives a white hygroscopic product which crystallises with one molecule of water and melts at 190° C. this product being soluble in cold water.

The hydrochloride of this compound melts at 230° C.

Gravimetric analysis. — $C_{15}H_{16}O_4N_2H_2O$, calculated: C%, 58.82; H%, 5.88; N%, 9.15. Found: C%, 58.78; H%, 6.00; N%, 9.25.

*Example 39.—(N-diethylaminoethyl)-3-carboxamide-4-ethoxy coumarin*

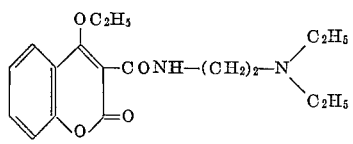

2.62 g. (0.01 mol) of 4-hydroxy-3 carbethoxy coumarin (B.P.=126° C.—Anschutz Annalen 367—183) and 1.27 g. (0.011 mol) of N,N-diethyl ethylene diamine (B.P.=144–145° C., J. Am. Chem. Soc. 67, 539, 1945) are heated on a metal bath, while distilling off the alcohol which has formed, for 30 minutes between 135 and 150° C.

The reaction mixture is left in vacuo at 100° C. for 5 minutes, the solid is then recrystallised from approximately 5 cc. of alcohol and white crystals are obtained which melt at 90° C.

The hydrochloride obtained by bubbling gaseous HCl into an alcoholic solution of the base melts at 163° C.

Gravimetric analysis. — $C_{18}H_{24}O_4N_2 \cdot HCl$, calculated: C%, 58.61; H%, 6.78; N%, 7.59. Found: C%, 58.24; H%, 6.82; N%, 7.34.

*Example 40.—(N-dicyclohexyl ethyl)-3-carboxamide-4-hydroxy coumarin*

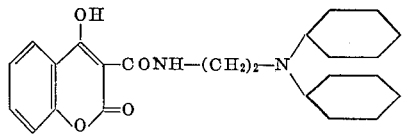

Under the conditions of the foregoing examples, 4.6 g. (0.02 mol) of 4-hydroxy-3 carbethoxy coumarin and 4.4 g (0.021 mol) of N,N-dicyclohexyl ethylene diamine (B.P. $_{21.8\ \text{millibars}}$=123° C. British Patent No. 614,164 of July 29, 1944) are heated to the region of 150–160° C.

After cooling, the product solidifies, it is washed with ether and it recrystallises from alcohol as long and fine white needles which melt with decomposition in the region of 225° C.

The melting points of the hydrochlorides were taken in tubes sealed to the Gallenkamp melting point apparatus.

*Example 41*

The process for preparation as described in this example is applicable to carboxamides of the formula

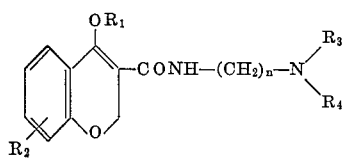

in which $n$, $R_1$, $R_2$, $R_3$ and $R_4$ have the meanings previously indicated.

(a) (ETHANOL)-3-CARBOXAMIDE-4-HYDROXY COUMARIN

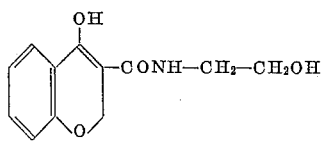

An intimate mixture of 5 g. (0.47 mol) of 4-hydroxy-3 carbethoxy coumarin and 1.4 g. (0.51 mol) of ethanolamine is progressively heated while distilling off the alcohol formed in the reaction.

The distillation of the ethanol is completed after heating for 40 minutes to 165° C.

The vitreous yellow paste obtained by cooling the reaction mixture is recrystallised from alcohol. After elimination of an insoluble product, white crystals are obtained which have a melting point of 118° C.

(b) (β-CHLOROETHYL)-3-CARBOXAMIDE-4-HYDROXY COUMARIN

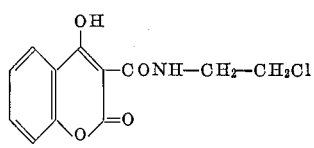

8.4 g. (0.066 mol) of thionyl chloride in 80 cc. of benzene are introduced dropwise into 13.8 g. (0.055 mol) of the preceding product which is in suspension in 135 cc. of benzene.

Heating then takes place for 3 hours under reflux. After filtration, the benzene is removed in vacuo and the residue which is obtained is recrystallised from alcohol. Bright yellow needles are obtained, which melt at 148° C. and have good solubility in hot 10% sodium bicarbonate. The yield of (β-chloroethyl)-3-carboxamide-4-hydroxy coumarin is 75%.

The condensation of the compound prepared under (b) with an amine of the form

is carried out by the procedure followed in the case of the preparation of the (N-diethylamino-ethyl)-3-carboxamide-4-hydroxy coumarin.

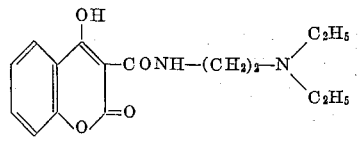

5.4 g. (0.02 mol) of (β-chloroethyl)-3-carboxamide-4-hydroxy coumarin and 3.6 g. (0.05 mol) of diethylamine in solution in 100 cc. of isopropanol are heated for 10 hours under reflux in the presence of 2.7 g. (0.02 mol) of anhydrous potassium carbonate. The substance is then filtered and taken up in boiling alcohol and allowed to crystallise in the cold. After a second recrystallisation, white crystals are obtained which melt at 154° C.

The melting point of this hydrochloride is 225° C. Its melting point is not lowered in a mixed melt with a specimen prepared from the base of which the method of preparation is described in Example 2.

What we claim is:
1. A compound of the formula

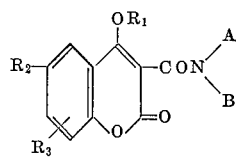

in which:
- $R_1$ is a member of the group consisting of hydrogen and an alkyl radical containing from 1 to 4 carbon atoms;
- $R_2$ is a member of the group consisting of hydrogen, halogen, and an alkyl radical containing from 1 to 4 carbon atoms and a nitro radical;
- $R_3$ is a member of the group consisting of hydrogen, halogen, an alkyl radical containing from 1 to 4 carbon atoms and a nitro radical;
- A is a member of the group consisting of the atoms necessary for completing in combination with B and the adjacent nitrogen atom an N-lower-alkyl piperazino ring, and the radical

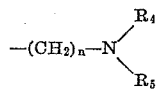

in which $n$ is an integer between 2 and 6;
- $R_4$ is a member of the group consisting of hydrogen, an alkyl radical containing from 1 to 4 carbon atoms, an alkenyl radical containing from 1 to 4 carbon atoms, a cyclohexyl radical, a hydroxyethyl radical, a phenyl radical, and the first link connected to the nitrogen atom adjacent a morpholino and piperidino nucleus;
- $R_5$ is a member of the group consisting of an alkyl radical containing from 1 to 4 carbon atoms, a cyclohexyl radical, a hydroxyethyl radical, a phenyl radical and the last link connected to the nitrogen atom adjacent a morpholino and piperidino nucleus;
- and B is a member of the group consisting of hydrogen, and the atoms necessary for completing in combination with A and the adjacent nitrogen atoms an N-lower alkyl piperazino ring.

2. 2(N - diethylamino) ethyl-3-carboxamide-4-hydroxy coumarin.

3. 2(N-dimethylamino) ethyl-3-carboxamide-4-hydroxy coumarin.

4. 2(N-monomethylamino) ethyl-3-carboxamide-4-hydroxy coumarin.

5. 2(N-di-n-butylamino) ethyl - 3 - carboxamide-4-hydroxy coumarin.

6. 3(N-di-n-butylamino)propyl - 3 - carboxamide-4-hydroxy coumarin.

7. 4(N-di-n-butylamino) butyl - 3 - carboxamide-4-hydroxy coumarin.

8. 2(N-di - n-propylamino) ethyl-3-carboxamide-4-hydroxy coumarin.

9. 4(N-di-n-butylamino) butyl-3-carboxamide-8-methyl-4-hydroxy coumarin.

10. 2(N - diisobutylamino) ethyl-3-carboxamide-4-hydroxy coumarin.

11. Nicotinate of 2(N-diethylamino) ethyl-3-carboxamide-4-hydroxy coumarin.

12. An hydrochloride of a compound of the formula

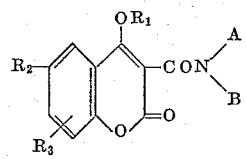

in which:
- $R_1$ is a member of the group consisting of hydrogen and an alkyl radical containing from 1 to 4 carbon atoms;
- $R_2$ is a member of the group consisting of hydrogen, halogen, and an alkyl radical containing from 1 to 4 carbon atoms and a nitro radical;
- $R_3$ is a member of the group consisting of hydrogen, halogen, an alkyl radical containing from 1 to 4 carbon atoms and a nitro radical;
- A is member of the group consisting of the atoms necessary for completing in combination with B and the adjacent nitrogen atom an N-lower-alkyl piperazino ring, and the radical

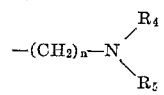

in which $n$ is an integer between 2 and 6;
- $R_4$ is a member of the group consisting of hydrogen, an alkyl radical containing from 1 to 4 carbon atoms, an alkenyl radical containing from 1 to 4 carbon atoms, a cyclohexyl radical, a hydroxyethyl radical, a phenyl radical, and the first link connected to the nitrogen atom adjacent a morpholino and piperidino nucleus;
- and B is a member of the group consisting of hydrogen, and the atoms necessary for completing in combination with A and the adjacent nitrogen atom an N-lower alkyl piperazino ring.

References Cited by the Examiner

UNITED STATES PATENTS

| 3,075,996 | 1/1963 | Raue | 260—343.2 |
| 3,122,557 | 2/1964 | Molho | 260—343.2 |

FOREIGN PATENTS 919,807 2/1963 Great Britain.

OTHER REFERENCES

Clinton et al., "Journ. Amer. Chem. Soc.," vol. 71 (1949) pp. 3602 to 3606.

WALTER A. MODANCE, *Primary Examiner.*

J. A. PATTEN, *Assistant Examiner.*